United States Patent [19]

Chubachi et al.

[11] Patent Number: 4,613,545
[45] Date of Patent: Sep. 23, 1986

[54] MAGNETIC RECORDING MEDIUM

[75] Inventors: Ryoji Chubachi, Sendai; Nobuyuki Nihei, Shiogama, both of Japan

[73] Assignee: Sony Corporation, Tokyo, Japan

[21] Appl. No.: 598,325

[22] PCT Filed: Jul. 1, 1983

[86] PCT No.: PCT/JP83/00211

§ 371 Date: Mar. 1, 1984

§ 102(e) Date: Mar. 1, 1984

[87] PCT Pub. No.: WO84/00241

PCT Pub. Date: Jan. 19, 1984

[30] Foreign Application Priority Data

Jul. 1, 1982 [JP] Japan .................... 57-114720

[51] Int. Cl.$^4$ .................... G11B 5/70
[52] U.S. Cl. .................... 428/328; 252/62.54; 360/134; 360/135; 360/136; 427/128; 428/329; 428/425.9; 428/694; 428/900; 428/522; 428/480
[58] Field of Search ............ 428/694, 900, 522, 425.9, 428/695, 480, 328, 329; 427/44, 128, 131; 252/62.54; 360/134-136

[56] References Cited

U.S. PATENT DOCUMENTS

| | | | |
|---|---|---|---|
| 4,074,012 | 2/1978 | Heikkinen | 428/900 |
| 4,152,485 | 5/1979 | Mizumura | 428/900 |
| 4,396,668 | 8/1983 | Saito | 428/900 |
| 4,404,253 | 9/1983 | Kohler | 428/694 |
| 4,407,901 | 10/1983 | Miyatsuka | 428/407 |
| 4,411,957 | 10/1983 | Tokuda | 428/425.9 |
| 4,415,630 | 11/1983 | Kubota | 428/522 |
| 4,420,531 | 12/1983 | Tokuda | 428/328 |
| 4,431,712 | 2/1984 | Matsufuji | 428/694 |
| 4,439,486 | 3/1984 | Yamada | 428/900 |
| 4,448,848 | 5/1984 | Okita | 427/44 |
| 4,451,531 | 5/1984 | Isobe | 427/44 |
| 4,455,345 | 6/1984 | Miyatuka | 428/900 |
| 4,465,737 | 8/1984 | Miyatuka | 428/900 |
| 4,521,486 | 6/1985 | Ninomiya | 427/128 |
| 4,529,661 | 7/1985 | Ninomiya | 427/128 |
| 4,537,833 | 8/1985 | Kasuga | 428/695 |
| 4,555,431 | 11/1985 | Miyatsuka | 428/141 |
| 4,571,364 | 2/1986 | Kasuga | 428/336 |

*Primary Examiner*—Ellis P. Robinson
*Attorney, Agent, or Firm*—Hill, Van Santen, Steadman & Simpson

[57] ABSTRACT

A magnetic recording medium has on a nonmagnetic support, a magnetic layer consisting mainly of an acicular magnetic powder and a binder. The medium has excellent magnetic characteristics required for short-wave recording and has an excellent durability. For this purpose, the medium contains a ferromagnetic metal powder which has a coercive force of not less than 1,000 Oe and a specific surface area as determined by the BET method, of not less that 45 m$^2$/g. The medium contains in the binder not less than 50% by weight of a resin which has a high dispersibility owing to the introduction of at least one polar group selected from the group consisting of polar groups having the general formulas of:

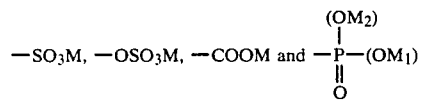

(wherein M is hydrogen, lithium, sodium or potassium; and M$_1$ and M$_2$ are hydrogen, lithium, sodium, potassium or alky groups).

8 Claims, No Drawings

MAGNETIC RECORDING MEDIUM

TECHNICAL FIELD

The present invention relates to a magnetic recording medium and, more particularly, to a short-wave recording magnetic recording medium in which a magnetic layer having a high coercive force and an excellent dispersibility is formed on a nonmagnetic support.

BACKGROUND ART

A tendency toward short-wave recording is significant for high-density recording in magnetic recording media, especially, magnetic recording media for VTRs. In order to obtain a high reproducing output in short-wave recording, it is indispensable that a magnetic layer of a magnetic recording medium has a high coercive force and a high residual flux density. However, such satisfactory magnetic characteristics cannot be obtained in a current magnetic recording medium which uses as a magnetic powder iron oxide magnetic powders such as $\gamma$—$Fe_2O_3$ or a chromium dioxide magnetic powder. The central recording wavelength attainable in practice is limited to about 1 $\mu$m.

In contrast to this, in a magnetic recording medium using a ferromagnetic powder as a magnetic powder, a coercive force Hc and a residual flux density Br of a magnetic layer formed thereon are both high, so that high reproducing output can also be obtained in a short-wave band. Since such a medium permits high-density recording, it is considered to be most promising and various associated developments are being made.

In Japanese Patent Application Nos. 56-20388 and 56-40202, the present applicant has previously proposed a magnetic recording medium which uses such a ferromagnetic metal powder and which is therefore suitable for short-wave recording, especially, short-wave recording having a central recording wavelength of 1 $\mu$m or less. However, in such a magnetic recording medium, when a fine ferromagnetic metal powder having a great specific surface area as used to improve, for example, the S/N ratio, various problems such is degradation in dispersibility of the ferromagnetic metal powder in a binder and an increase in the viscosity of a magnetic coating are raised. These problems adversely affect the surface properties, durability, magnetic characteristics and so on of a magnetic layer, which prevents the manufacture of a high-performance magnetic recording medium. This also impairs the workability in the manufacture of a magnetic recording medium. In order to improve the dispersibility of the magnetic powder, methods have been proposed wherein a surfactant is used as a dispersant, and the content of a hydrophillic group such as an OH group in the binder is increased. However, in either case, a satisfactory dispersibility can not be obtained. Moreover, it has been found that physical properties and mechanical properties and abrasion resistance, such as especially rubbing-off, of a magnetic layer are largely degraded.

DISCLOSURE OF INVENTION

It is an object of the present invention to provide a magnetic recording medium for short-wave recording which uses a ferromagnetic metal powder as a magnetic powder, which has an improved dispersibility of the magnetic powder, a low noise level, and excellent magnetic characteristics such as squareness ratio.

For this reason, the present invention relates to a magnetic recording medium having, on a nonmagnetic support, a magnetic layer consisting mainly of an acicular ferromagnetic metal powder and a binder, characterized in that the metal powder has a coercive force of not less than 1,000 Oe and a specific surface area determined by the BET method is not less than 45 $m^2/g$, said binder containing not less than 50% by weight of a resin having at least one polar group selected from the group consisting of polar groups having the general formulas:

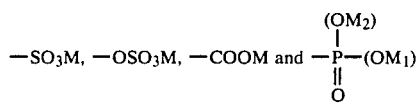

(wherein M is hydrogen, lithium, sodium, or potassium; and $M_1$ and $M_2$ are hydrogen, lithium, sodium, potassium or alkyl groups).

According to the present invention, since a fine ferromagnetic metal powder having a high coercive force is used in combination with a binder having a polar group, a short-wave recording magnetic recording medium is obtained which has excellent magnetic characteristics and a good dispersibility of the ferromagnetic metal powder, resulting in excellent surface properties, durability and performance.

BEST MODE OF CARRYING OUT THE INVENTION

In a magnetic recording medium in accordance with the present invention, the coercive force Hc of a magnetic powder is selected to be not less than 1,000, preferably 1,000 to 2,000 Oe, and more preferably 1,100 to 1,500 Oe. When short-wave recording is to be performed, the coercive force Hc must be considerably high, that is, preferably not less than 1,000 Oe. However, when the coercive force is excessively high, a saturation occurs in a magnetic head during recording, and erasure of recorded contents becomes difficult.

In order to obtain a coercive force Hc of not less than 1,000 Oe, since the coercive force Hc depends on the shape anisotropy of a ferromagnetic metal particle, the axial ratio of the ferromagnetic metal particle, that is, the ratio of the major axis to the minor axis, is selected to be not less than 7 and preferably not less than 10.

The thickness after drying of a coating layer as a magnetic layer is preferably 0.5 to 6 $\mu$m. When the coated thickness is too small, a uniform coating layer is difficult to form, which results in a signal loss, i.e., a so-called drop-out. On the other hand, when the coated thickness is too large, thickness loss due to self-demagnetization occurs.

A weight ratio P/B of the magnetic powder and the binder constituting a magnetic layer is selected to be 5 to 12 and preferably 6 to 10 for each part of binder. When the amount of the binder is too large, that is, when the ratio P/B is too small, a residual flux density Br, is too small, and an improvement in the S/N ratio cannot be expected. On the other hand, when the ratio P/B is too large, the rubbing-off is increased, and the durability is degraded.

In accordance with the present invention, a ferromagnetic metal powder for a magnetic layer having a specific surface area as determined by the BET method, of not less than 45 $m^2/g$ is used. This is attributed to the following reasons. With particles having a specific surface area of less than 45 m$^2$/g are used, a satisfactory effect of improving the S/N ratio cannot be expected. On the other hand, if the specific surface area exceeds 45 m$^2$/g, when modulation noise is measured, a desired low noise level is obtained even in the case of short waves having a recording wavelength of 1 μm or less. The specific surface area may be increased above 45 m$^2$/g or to a degree that the powder is not rendered ultra-paramagnetic. However, in practice, the specific surface area preferably has a range of 45 to 150 m$^2$/g.

A ferromagnetic metal powder to be used herein may be an acicular metal powder of Fe, Fe—Co, Fe—Co—Ni, or the like or, when considering corrosion resistance and prevention of the sintering during manufacture, may be an acicular metal powder containing a small amount of an additive element such as Al, Cr, or Si. These acicular metal powders can be prepared by reducing, in a reducing atmosphere such as H$_2$ gas, an acicular iron oxide, water-containing iron oxide, or iron oxide or water-containing iron oxide optionally containing a metal of such as Ni and Co, as a starting material. The specific surface area of the ferromagnetic metal powder can be controlled by properly selecting the specific surface area of the aforementioned starting material.

In a magnetic recroding medium of the present invention, the binder contains a resin having at least one polar group selected from the group consisting of polar groups having the general formulas:

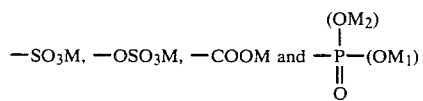

(wherein M is a hydrogen, lithium, sodium, or potassium; and M$_1$ and M$_2$ are hydrogen, lithium, sodium, potassium or alkyl groups).

In the general formulas above, the alkyl groups are preferably saturated, straight or branched chain aliphatic hydrocarbon residues having up to 23 carbon atoms. Examples of such an alkyl group may include a tricosyl group, docosyl group, eicosyl group, nonadecyl group, octadecyl group, hexadecyl group, tridecyl group, undecyl group, decyl group, nonyl group, octyl group, hexyl group, pentyl group, butyl group, t-butyl group, propyl group, isopropyl group, ethyl group, and methyl group. Note that M$_1$ and M$_2$ may be the same or different. Since such a polar group has a large polarity and has a good compatibility with a ferromagnetic metal powder, it improves the dispersibility of the ferromagnetic metal.

In accordance with the present invention, the resin containing the aforementioned polar group is contained in the binder in an amount of not less than 50% by weight based on the total binder components. When the amount of the resin is less than 50% by weight, a satisfactry dispersibility cannot be obtained, so that the improvements in the surface properties and the S/N ratio cannot be expected. When a dispersant is used to compensate this, the rubbing-off is increased significantly to an impractical degree.

A resin having a polar group to be used herein has preferably a molecular weight of not more than 50,000. If the molecular weight of the resin exceeds 50,000, when the specific surface area determined by the BET method, of a magnetic powder as shown in FIG. 1 becomes large, the coating viscosity becomes too high, exceeding an acceptable value. The resin preferably has a molecular weight of not less than 2,000. The reason is that, if the molecular weight of the resin is less than 2,000, when the magnetic coating is applied on a support and is hardened with a hardener, an unreacted portion is formed and low molecular weight constituents remain, which will degrade the physical properties of the coating layer.

The resin having the polar group used herein preferably has a molecular weight of 200 to 50,000 per polar group. When this molecular weight is lower than 200 the hydrophillic nature of the resin is too strong so that the solubility in a solvent, compatibility with other resins in the binder, and humidity resistance of a magnetic layer are degraded. On the other hand, when this molecular weight exceeds 50,000, an effect of improving the dispersibility is unsatisfactory.

A resin having the aforementioned polar group according to the present invention may be a polyester resin, a polyurethane resin, a vinyl chloride-based resin, into which the polar group has been introduced. Such a resin can be prepared by various methods. For example, a polyester resin containing a metal sulfonate group can be prepared by using a dicarboxylic acid containing a metal sulfonate group as part of a dicarboxylic acid component to be used, and condensing the dicarboxylic acid containing the metal sulfonate group and a dicarboxylic acid having no metal sulfonate group with a diol. A polyurethane resin containing a metal sulfonate group can be prepared by using three types of starting materials of polyester containing the metal sulfonate group together with a diisocyanate so as to perform a condensation reaction and an addition reaction. There may be further adopted a method wherein a polar group is introduced into a polyester resin, a polyurethane resin or a vinyl chloride-based resin by modification. According to this method, the polar group can be introduced into the resins by conducting condensation through dehydrochlorination reaction of the resins with a compound containing in molecules the polar group and chlorine, such as Cl—CH$_2$CH$_2$ SO$_3$ M, Cl—CH$_2$CH$_2$OSO$_3$M, Cl—CH$_2$ COOM, and

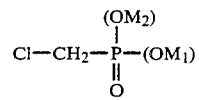

Carboxylic acid components to be used herein to prepare polyester resins or polyurethane resins may be an aromatic dicarboxylic acids such as terephthalic acid, isophthalic acid, orthophthalic acid, or 1,5-naphthalic acid; aromatic hydroxycarboxylic acids such as p-hydroxybenzoic acid or p-(hydroxy-ethoxy) benzoic acid; aliphatic dicarboxylic acids such as succinic acid, adipic acid, azelaic acid, sebacic acid, or dodecane dicarboxylic acid; or tri- or tetracarboxylic acids such as trimellitic acid, trimesic acid, or pyromellitic acid. Terephthalic acid, isophthalic acid, adipic acid, and sebacic acid are particularly preferable.

Dicarboxylic acid components containing metal sulfonate groups may, for example, be 5-sodium sulfoisophthalate, 5-potassium sulfoisophthalate, 2-sodium sulfoterephthalate, or 2-potassium sulfoterephthalate.

Diol components may, for example, be ethylene glycol, propylene glycol, 1, 3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, an ethylene oxide adduct and propylene oxide adduct of bisphenol A, an ethylene oxide adduct of hydrogenated bisphenol A, polyethylene glycol, polypropylene glycol, polytetramethylene glycol, or the like. Additionally, trior tetraols such as trimethylol ethane, trimethylol propane, glycerin, or pentaerythritol may be used.

Diisocyanate components which may be used herein in order to prepare polyurethane resins may be 2,4-tolylenediiscyanate, 2,6-tolylenediisocyanate, p-phenylenediisocyanate, diphenylmethanediisocyanate, m-phenylenediisocyanate, hexamethylenediisocyanate, tetramethylenediisocyanate, 3,3'-dimethoxy-4,4'-biphenylenediisocyanate, 2,4-naphthalenediisocyanate, 3,3'-dimethyl-4,4'-biphenylenediisocyanate, 4,4'-diisocyanate-diphenyl ether, 1,3-naphthalenediisocyanate, p-xylylenediisocyanate, m-xylylenediisocyanate, 1,3-diisocyanatemethylcyclohexane, 1,4-diisocyanatemethylcyclohexane, 4,4'-diisocyanatedicyclohexane, 4,4'-diisocyanatedicyclohexylmethane, isophoronediisocyanate, or the like.

When a metal sulfonate group is introduced by modifying a vinyl chloride-based resin, the vinyl chloride-based resin may be vinyl chloride-vinyl acetate-vinyl alcohol copolymer, vinyl chloride-vinyl propionate-vinyl alcohol copolymer, vinyl chloride-vinyl propionate-vinyl aclcohol copolymer, vinyl chloride-vinyl acetate-vinyl maleate-vinyl alcohol copolymer, vinyl chloride-vinyl propionate-vinyl maleate-vinyl alcohol copolymer or the like. The OH group of the vinyl alcohol contained in such a vinyl chloride-based resin is subjected to a dehydrochlorination reaction with chlorine in a metal sulfonate containing chlorine such as Cl—CH$_2$CH$_2$SO$_3$M or Cl—SO$_3$M in a polar organic solvent such as dimethylformamide or dimethyl sulfoxide in the presence of dehydrochlorinating agents such as amines, e.g., pyridine, picoline or triethylamine, or epoxy compounds such as ethylene oxide or propylene oxide.

To a magnetic layer may further be added aluminum oxide, chromium oxide, silicon oxide or the like as a reinforcing agent; olive oil or the like as a lubricant; carbon black or the like as a antistatic agent; or lecithin or the like as a dispersant.

The magnetic layer is generally formed by dissolving components of the magnetic layer in an organic solvent to prepare a magnetic coating, and then by applying the magnetic coating on a nonmagnetic support. Suitable organic solvents to be used herein may be ketones (e.g., acetone, methyl ethyl ketone, methyl isobutyl ketone, or cylcohexanone), alcohls (e.g., methanol, ethanol, propanol, or butanol), esters (e.g., methyl acetate, ethl acetate, butyl acetate, ethyl lactate, or glycol acetate), monoethyl ether, glycol ethers (e.g., ethylene glycol dimethyl ether, ethylene glycol monoethyl ether, or dioxane), aromatic hydrocarbons (e.g., benzene, toluene, or xylene), aliphatic hydrocarbon (e.g., hexane or heptane), nitropropane or the like.

The support on which a magnetic coating is applied is nonmagnetic and may be materials such as a polyester (e.g., polyethylene terephthalate), polyolefins, (e.g., a polypropylene), cellulose derivatives (e.g., cellulose triacetate or cellulose diacetate), polycarbonate, polyvinyl chloride, polyimide, polyamide, polyhydrazide, metals (e.g., aluminum or copper), paper or the like.

The present invention will now be described by way of examples.

EXAMPLE 1

| | |
|---|---|
| Ferromagnetic metal powder (specific surface area: 45 m$^2$/g; axial ratio: 11–13) | 670 parts by weight |
| Polyurethane resin containing a sodium sulfonate group (molecular weight: 18,000) | 100 parts by weight |
| Cr$_2$O$_3$ particles | 60 parts by weight |
| Carbon black | 35 parts by weight |
| Olive oil | 7 parts by weight |
| Toluene | 350 parts by weight |
| Methyl ethyl ketone | 350 parts by weight |
| Cyclohexanone | 350 parts by weight |

The above composition was milled and dispersed in a ball mill for 20 hours. Then, after adding 28 parts of an isocyanate compound ("Desmodur L": manufactured by Bayer Co., Ltd.), the mixture was dispersed by high speed shearing to prepare a magnetic coating.

The magnetic coating was applied on one surface of a polyethylene terephthalate base having a thickness of 14 μm and a surface roughness of 0.03 μm such that the coating layer will have a dried thickness of 4.0 μm. The layer was oriented in a D.C. magnetic filed of 2,500 Gauss, dried at 80° C., and subjected to supercalendering. The base with the layer was cut into a width of ½ inch to prepare a magnetic tape. The magnetic characteristics of the magnetic tape were measured. The results obtained are given in Table 3.

EXAMPLES 2–5

Magnetic tapes were prepared following the procedures Example 1 except that a polyurethane resin containing a sodium sulfonate group and a vinyl chloride-vinyl acetate-vinyl alcohol copolymer (VAGH: manufactured by U.C.C.) were used in the amounts designated in Table 1 in place of 100 parts by weight of the polyurethane resin containing a sodium sulfonate group. The magnetic characteristics of the resultant tapes were measured. The results obtained are shown in Table 3.

TABLE 1

| Examples | Added amount of polyurethane resin containing sodium sulfonate group | Added amount of vinyl chloride-vinyl acetate-copolymer |
|---|---|---|
| 1 | 100 parts by weight | — |
| 2 | 80 parts by weight | 20 parts by weight |
| 3 | 50 parts by weight | 50 parts by weight |
| 4 | 40 parts by weight | 60 parts by weight |
| 5 | 10 parts by weight | 90 parts by weight |

EXAMPLE 6

| | |
|---|---|
| Ferromagnetic metal powder (specific surface area: 60 m$^2$/g; axial ratio: 11 to 13) | 670 parts by weight |
| Polyester resin containing sodium sulfonate group (molecular weight: 20,000) | 100 parts by weight |
| Cr$_2$O$_3$ particles | 60 parts by weight |
| Carbon black | 35 parts by weight |
| Olive oil | 7 parts by weight |
| Toluene | 350 parts by weight |
| Methyl ethyl ketone | 350 parts by weight |

| -continued | |
|---|---|
| Cyclohexanone | 350 parts by weight |

A magnetic tape was prepared using the above composition and following the procedures similar to Example 1. The results obtained are given in Table 3.

EXAMPLES 7–9

Magnetic tapes were prepared in a similar manner to Example 6 except tnat a polyester resin containing a sodium sulfonate group and a thermoplastic polyurethane resin ("N-3022": manufactured by Nippon Polyurethane Kogyo K.K.) were used in the amounts designated in Table 2 in place of 100 parts by weight of the polyester resin containing a sodium sulfonate group. The magnetic characteristics of the resultant magnetic tapes were measured. The results obtained are given in Table 3.

TABLE 2

| Examples | Added amount of polyester resin containing sodium sulfonate group | Added amount of thermoplastic polyurethane resin |
|---|---|---|
| 6 | 100 parts by weight | — |
| 7 | 70 parts by weight | 30 parts by weight |
| 8 | 50 parts by weight | 50 parts by weight |
| 9 | 40 parts by weight | 60 parts by weight |

EXAMPLE b 10

| Ferromagnetic metal powder (specific surface area: 45 m$^2$/g; axial ratio: 11 to 13) | 670 parts by weight |
|---|---|
| Vinyl chloride-Vinyl Acetate-vinyl alcohol copolymer containing sodium sulfonate group | 80 parts by weight |
| Thermoplastic polyurethane resin ("N-3022": manufactured by Nippon Polyurethane Kogyo K.K.) | 20 parts by weight |
| Cr$_2$O$_3$ particles | 60 parts by weight |
| Carbon black | 35 parts by weight |
| Olive oil | 7 parts by weight |
| Toluene | 350 parts by weight |
| Methyl ethyl ketone | 350 parts by weight |
| Cyclohexanone | 350 parts by weight |

A magnetic tape was prepared using the above composition in the manner similar to Example 1. The magnetic characteristics of the tape were measured. The results obtained are given in Table 3.

TABLE 3

| Examples | Coercive force Hc(Oe) | Residual flux density Br(G) | Squareness ratio | RF output (dB) | C/N (dB) |
|---|---|---|---|---|---|
| 1 | 1,190 | 2,810 | 0.79 | 0 | 50.9 |
| 2 | 1,190 | 2,760 | 0.78 | −0.2 | 50.7 |
| 3 | 1,195 | 2,575 | 0.75 | −0.6 | 50.2 |
| 4 | 1,200 | 2,210 | 0.69 | −1.4 | 48.8 |
| 5 | 1,210 | 1,820 | 0.66 | −2.5 | 47.1 |
| 6 | 1,230 | 2,710 | 0.78 | −0.1 | 54.3 |
| 7 | 1,230 | 2,640 | 0.76 | −0.4 | 53.9 |
| 8 | 1,235 | 2,390 | 0.71 | −0.7 | 53.5 |
| 9 | 1,245 | 1,870 | 0.68 | −2.4 | 50.8 |
| 10 | 1,190 | 2,760 | 0.78 | −0.1 | 50.6 |

As can be seen from Table 3, the magnetic tapes in which the binder contains the resin containing a metal sulfonate group, in the amount of not less than 50% (Examples 1 to 3, 6 to 8, and 10) has maintained the C/N ratio of 50 dB or more. Good results were also obtained with respect to the residual flux density, the squareness ratio, and high-frequency (RF) output. This is due to the improvement in the surface properties of the magnetic layer by improved dispersibility of the magnetic powder. The improvement in the surface properties also resulted in an improvement in durability.

Since the binder containing a polar group according to the present invention has itself a high dispersibility, it eliminates the use of an additional dispersant or requires only a small amount of such an additional dispersant. In correspondence with such a reduction in the amount of dispersant to be used, the amount of the nonmagnetic material for improving durability can be increased, so that the durability characteristics such as rubbing-off characteristics and wear resistance are improved.

We claim:

1. A magnetic recording medium having on a nonmagnetic support a magnetic layer measuring from 0.5 to 6 microns and consisting mainly of an acicular ferromagnetic metal powder and a binder, characterized in that said acicular ferromagnetic metal powder has a coercive force of not less than 1,000 Oe, a specific surface area as determined by the BET method, of not less than 45 m$^2$/g, an axial ratio of not less than 7, and said binder contains not less than 50% by weight of a resin having a molecular weight not in excess of 50,000 and containing at least one polar group selected from the group consisting of polar groups having the general formulas:

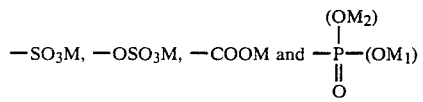

(wherein M is hydrogen, lithium, sodium or potassium; and M$_1$ and M$_2$ are hydrogen, lithium, sodium, potassium or alkyl groups), the weight ratio of feromagnetic metal powder to binder being in the range of 5 to 12.

2. A magnetic recording medium according to claim 1, characterized in that said acicular metal powder has a coercive force of 1,000 to 2,000 Oe.

3. A magnetic recording medium according to claim 1, characterized in that said acicular ferromagnetic metal powder has the coercive force of 1,100 to 1,500 Oe.

4. A magnetic recording medium according to claim 1, characterized in that an axial ratio of said acicular ferromagnetic metal powder is not less than 10.

5. A magnetic recording medium according to claim 1, characterized in that said alkyl group is a saturated, straight or branched chain aliphatic hydrocarbon group having up to 23 carbon atoms.

6. A magnetic recording medium according to claim 1, characterized in that the molecular weight of said resin having the polar group is 2,000 to 50,000.

7. A magnetic recording medium according to claim 1, characterized in that said resin having the polar group has a molecular weight of 200 to 50,000 per polar group.

8. A magnetic recording medium according to claim 1, characterized in that a main chain of said resin having the polar group is polyester, polyurethane or vinyl chloride-based copolymer.

* * * * *